(12) United States Patent
Lee et al.

(10) Patent No.: US 8,355,144 B2
(45) Date of Patent: Jan. 15, 2013

(54) APPARATUS AND METHOD OF CHANGING PRINTER DRIVER, AND PRINTING SYSTEM AND METHOD USING THE SAME

(75) Inventors: Sung-myun Lee, Anyang-si (KR); Jae-kyoo Kang, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1114 days.

(21) Appl. No.: 11/317,073

(22) Filed: Dec. 27, 2005

(65) Prior Publication Data
US 2006/0139675 A1  Jun. 29, 2006

(30) Foreign Application Priority Data
Dec. 24, 2004  (KR) .................. 10-2004-0112264

(51) Int. Cl.
G06F 3/12 (2006.01)
G06K 15/00 (2006.01)

(52) U.S. Cl. ................. 358/1.13; 358/1.15; 358/1.14; 358/1.12; 358/1.1

(58) Field of Classification Search .............. None
See application file for complete search history.

(56) References Cited

U.S. PATENT DOCUMENTS

| | | | | |
|---|---|---|---|---|
| 6,567,175 B1 * | 5/2003 | Lee | ............... | 358/1.14 |
| 6,891,631 B1 * | 5/2005 | Nakazato | ............... | 358/1.13 |
| 2003/0103235 A1 * | 6/2003 | Gomi | ............... | 358/1.15 |

FOREIGN PATENT DOCUMENTS

| | | |
|---|---|---|
| JP | 8-152985 | 6/1996 |
| JP | 8-324035 | 10/1996 |
| JP | 9-188039 | 7/1997 |
| JP | 9-272233 | 10/1997 |
| JP | 11-265267 | 9/1999 |
| JP | 2000-231463 | 8/2000 |

(Continued)

OTHER PUBLICATIONS

Korean Office Action dated Apr. 27, 2006 issued in KR 2004-112264.

*Primary Examiner* — Vincent Rudolph
*Assistant Examiner* — Marcus T Riley
(74) *Attorney, Agent, or Firm* — Stanzione & Kim, LLP

(57) ABSTRACT

An apparatus and method of changing a printer driver, and a printing system and method using the same. The apparatus includes a buffer to store a print command, a driver storing unit to store a plurality of printer drivers corresponding to a designated printer, a driver selecting unit to select a printer driver corresponding to printer identification information from the driver storing unit when the printer identification information is input, and a command processing unit generate data that is used for printing by processing the print command stored in the buffer using the selected printer driver and generating an error signal if an error occurs during processing the print command. The printing system includes a host to select the printer driver corresponding to the designated printer from the plurality of printer drivers for the designated printer and to generate the data for printing if identification information of the printer or a request for a change of the selected printer driver is received, the printer selecting a printer emulator corresponding to the printer driver selected by the host from a plurality of printer emulators, and processing and printing the data generated by the host.

20 Claims, 8 Drawing Sheets

FOREIGN PATENT DOCUMENTS

| | | |
|---|---|---|
| JP | 2000-250721 | 9/2000 |
| JP | 2000-263857 | 9/2000 |
| JP | 2001-5622 | 1/2001 |
| JP | 2001-34444 | 2/2001 |
| JP | 2001-88405 | 4/2001 |
| JP | 2001-202214 | 7/2001 |
| JP | 2004-5697 | 1/2004 |
| KR | 2000-45087 | 7/2000 |

* cited by examiner

APPARATUS AND METHOD OF CHANGING PRINTER DRIVER, AND PRINTING SYSTEM AND METHOD USING THE SAME

CROSS-REFERENCE TO RELATED APPLICATIONS

This application claims the priority of Korean Patent Application No. 10-2004-0112264, filed on Dec. 24, 2004, in the Korean Intellectual Property Office, the disclosure of which is incorporated herein in its entirety by reference.

BACKGROUND OF THE INVENTION

1. Field of the Invention

The present general inventive concept relates to a printing apparatus and method, and more particularly, to an apparatus and method of changing a printer driver, and a printing system and method using the same.

2. Description of the Related Art

Generally, printer drivers are developed by individual printer manufacturers. Therefore, when a user purchases a printer to perform a printing operation, the user is provided with a printer driver for the printer manufactured by the printer manufacturer.

Printer manufacturers usually adopt a printer driver language that was agreed in advance by the printer manufacturers and has been widely used to make their printers compatible with other printers manufactured by other printer manufacturers.

A conventional method of printing an image or a text in an application program is as follows. To print the image or the text in the application program, a user selects a print command through a user menu. Then, a printer driver receives the print command, converts desired data in the application program into data that can be printed, and transmits the converted data to a printer. In this case, the printer driver and the printer use the same printing language which has been previously agreed.

FIG. 1 is a block diagram of a conventional printing system for explaining a general printing process. When a user selects a print command on a menu provided by an application program 100 and generates the print command to print an image or a text in the application program 100, the application program 100 outputs a print command. A printer driver 120 interprets the print command transmitted from the application program 100 and generates print data or reformats the print command transmitted from the application program 100. A printer 140 receives the print data or the reformatted print command. If data received from the printer driver 120 is the print data, the printer 140 unzips and prints the print data. If the received data is the reformatted print command, the printer 140 interprets the reformatted print command and generates printable data.

In the conventional printing system, a single driver using only one printing language is used as the printer driver 120 of the printer 140. Thus, the print data is created in a predetermined format. The printer driver 120 can be largely divided into two types. One of the two types of printer drivers interprets print commands created in an application program and compresses data to print after a host generates the data, and transmits the data to a printer. The other one of the two types of printer drivers reformats the print commands generated in the application program into a predetermined format and transmit the reformatted print commands to the printer. In other words, the second type of printer drivers output the reformatted print commands that can be interpreted and printed by the printer.

An example of the one of the two printer types of the printer drivers is a graphics device interface (GDI) type printer driver, and an example of the other one of the two printer types of the printer drivers is a printer control language (PCL) type printer driver. The one of the two types of the printer drivers secures a memory space in units of pages and generates print data in the space. Therefore, the one of the two types of the printer drivers generates a bitmap as the print date to be printed. The generated bitmap is compressed according to a method determined by each manufacturer to minimize the size of transmission data and transmitted to a printer.

As described above, the other one of the two types of the printer drivers reformats the print commands transmitted from the application program and transmits the print commands to the printer. The print commands may be reformatted in a general format. An example of the general format is a format used by the PCL type printer drivers, and printer drivers using the general format are compatible with other types of printer drivers.

However, the conventional printing system has the following problems. First, a printer driver is dedicated to a printer when the printer is released in the market, that is, when the printer is manufactured. In other words, only one printer driver is used in a designated printer. Even if other printer driver has better advantages that the only one printer driver, the other printer driver cannot be used in the designated printer. Specifically, while various printer drivers have their own advantages and disadvantages, only one printer driver is involved in a printing operation of the designated printer. Thus, disadvantages as well as advantages of the printer driver are reflected in the designated printer.

Second, the printing operation cannot be performed when a bug occurs in the printer driver during the printing operation or a software error occurs in the printer that receives data. Thus, a user cannot print desired data even though the printing operation is repeated. Such a problem increases printer maintenance costs.

SUMMARY OF THE INVENTION

The present general inventive concept provides a method and apparatus to change a printer driver, which enable a user to stably print a document by changing the printer driver when a driver or firmware error occurs during a printing operation.

The present general inventive concept also provides a printing system and method of changing a printer driver.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an apparatus to change a printer driver, the apparatus including a buffer to store a print command, a driver storing unit to store a plurality of printer drivers corresponding to a designated printer, a driver selecting unit to select one of the plurality of printer drivers corresponding to printer identification information from the driver storing unit when the printer identification information is input, and a command processing unit to generate data that is used in a printing operation by processing the print command stored in the buffer using the selected printer driver and requesting the driver selecting unit to modify the selected printer driver if an error occurs during processing the print command.

The driver selecting unit may include an identification information database to store the printer identification information and at least one driver identification information corresponding to the printer identification information, an identification information updating unit to delete identification information of the selected printer driver from the identification information database and to request a change of the selected printer driver if the error occurs while the command processing unit processes the print command or if an error signal is received from the designated printer, an identification information retrieving unit to retrieve the driver identification information corresponding to the printer identification information from the identification information database if the printer identification information is input or if there is a request for the change of the selected printer driver, and a driver determining unit to select another printer driver corresponding to the retrieved driver identification information.

The error that occurs in the command processing unit may be a general protection fault, an error that appears when a signal indicating that a print job corresponding to the data has been completed normally is not generated by the printer within a predetermined period of time, or an error that occurs when the printer processes the print command.

The foregoing and/or other aspects of the present general inventive concept may be achieved by providing a method of changing a printer driver, the method including storing a print command in a buffer when the print command is input, selecting a printer driver corresponding to printer identification information from a driver storing unit that stores a plurality of printer drivers corresponding to a printer model when the printer identification information is input, and generating data that is used for a printing operation by processing the print command stored in the buffer using the selected printer driver and, if an error occurs during processing the print command, informing the occurrence of the error.

The selecting of the printer driver may include implementing an identification information database to store the printer identification information and at least one driver identification information corresponding to the printer identification information, deleting identification information of the printer driver from the identification information database and requesting a change of the printer driver to another printer driver if an error occurs during processing the print command or if information regarding the error is received from the designated printer, retrieving driver identification information corresponding to the printer identification information from the identification information database if the printer identification information is input or if there is a request for the change of printer driver, and selecting the another printer driver corresponding to the retrieved driver identification information from the driver storing unit.

The retrieving of the driver identification information may include retrieving the driver identification information corresponding to the printer identification information from the identification information database if the printer identification information is input, and retrieving the driver identification information corresponding to the printer identification information from the identification information database if there is the request for the change of the printer driver, and selecting the driver identification information having a higher priority than other driver identification information to correspond to the another printer driver.

The error may be a general protection fault, an error that appears when a signal indicating that a print job corresponding to the data for printing has been completed normally is not generated by the designated printer within a predetermined period of time, or an error that occurs when the designated printer processes a command.

The foregoing and/or other aspects of the present general inventive concept may be achieved by providing a printing system including a host to store a plurality of printer drivers, to select one of the plurality of printer drivers to correspond to a designated printer, and to generate data for printing in the designated printer using the selected printer driver if printer identification information of the designated printer or a request for a change of the printer driver is received, wherein the printer selects a printer emulator corresponding to the printer driver selected by the host from a plurality of printer emulators, and processes and prints the data generated by the host.

The host may include a buffer storing a print command that is input, a driver storing unit to store the plurality of printer drivers corresponding to the printer, a driver selecting unit to select the one of the plurality of printer drivers corresponding to the printer identification information from the driver storing unit when the printer identification information is input, and a command processing unit to generate the data for printing by processing the print command stored in the buffer using the selected printer driver and requesting the driver selecting unit to modify the selected driver if an error occurs during processing the print command.

The driver selecting unit may include an identification information database to store the printer identification information and at least one driver identification information corresponding to the printer identification information, an identification information updating unit to delete identification information of the printer driver from the identification information database and to request the change of the printer driver if the error occurs when the command processing unit processes the print command or if the error signal is received from the printer, an identification information retrieving unit to retrieve driver identification information corresponding to the printer identification information from the identification information database if the printer identification information is input or if there is the request for the change of the printer driver, and a driver determining unit to select another one of the plurality of printer drivers corresponding to the retrieved driver identification information.

The printer may include a printer identification information transmitting unit to transmit the printer identification information to the driver selecting unit when a print job starts, an emulator selecting unit to select the printer emulator corresponding to the selected printer driver when receiving the data generated by the command processing unit, and a print data processing unit to process and print the data generated by the command processing unit using the selected printer emulator and, when the data is processed normally or the error occurs, informing the host of a processing result.

The foregoing and/or other aspects of the present general inventive concept may be achieved by providing a printing method including selecting one of a plurality of printer drivers corresponding to a designated printer and generating data for printing using the selected printer driver if identification information of the printer or a request for a change of a printer driver is received, selecting a printer emulator corresponding to the selected printer driver from a plurality of printer emulators in the designated printer, and processing and printing the data for printing in the designated printer.

The selecting of the printer driver may include storing a print command in a buffer when the print command is input, selecting the printer driver corresponding to printer identification information from a driver storing unit that stores the plurality of printer drivers corresponding to the designated printer when the printer identification information is input, and generating the data needed for printing by processing the print command stored in the buffer using the selected printer driver and, if an error occurs while processing the print command, informing the occurrence of the error.

The selecting of the printer driver may include implementing an identification information database to store the printer identification information and at least one driver identification information corresponding to the printer identification information, deleting identification information of the designated printer driver from the identification information database and requesting the change of printer driver if the error occurs while processing the print command or if information regarding the error is received from a printer, retrieving driver identification information corresponding to the printer identification information from the identification information database if the printer identification information is input or if there is the request for the change of the printer driver, and selecting another printer driver corresponding to the retrieved driver identification information from the driver storing unit.

The retrieving of the driver identification information may include retrieving the driver identification information corresponding to the printer identification information from the identification information database if the printer identification information is input, and retrieving the driver identification information corresponding to the printer identification information from the identification information database if there is the request for the change of the printer driver and selecting the driver identification information having a higher priority than other driver identification information.

The generating of the data may include executing the print command stored in the buffer using the selected printer driver, determining whether a general protection fault has occurred, outputting the occurrence of the error to delete identification information of the printer driver currently being used if it is determined that the general protection fault has occurred and transmitting print data to the designated printer if it is determined that the general protection fault did not occur, storing information of a current page of the print data and checking whether an ACK signal indicating that the print data was processed normally is received from the printer, and deleting information of the current page corresponding to the ACK signal if the ACK signal is received, performing the executing, determining, outputting, and storing operations until a last page of the print data is printed, and outputting the occurrence of the error to delete the identification information of the printer driver currently being used if the ACK signal is not received within a predetermined period of time.

The selecting of the printer emulator may include transmitting the printer identification information when a print job corresponding to the data starts; selecting the printer emulator corresponding to the selected printer driver when receiving the data needed for printing in the operation of selecting the printer driver, and processing the data for printing using the selected printer emulator, transmitting the ACK signal if the processing of the data is completed normally and printing the print data, and transmitting an error signal if the processing of the data is not completed normally. The processing of the data and reporting of a processing result may be performed in a unit of a page.

The foregoing and/or other aspects of the present general inventive concept may be achieved by providing a computer-readable recording medium storing a program for executing a method of selecting one of a plurality of printer drivers to communicate with a designated printer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
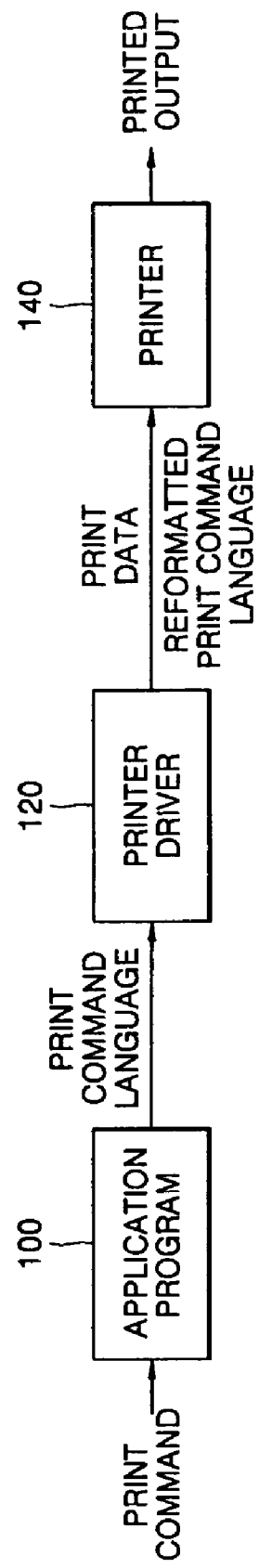
FIG. 1 is a block diagram illustrating a conventional printing system for explaining a general printing process.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
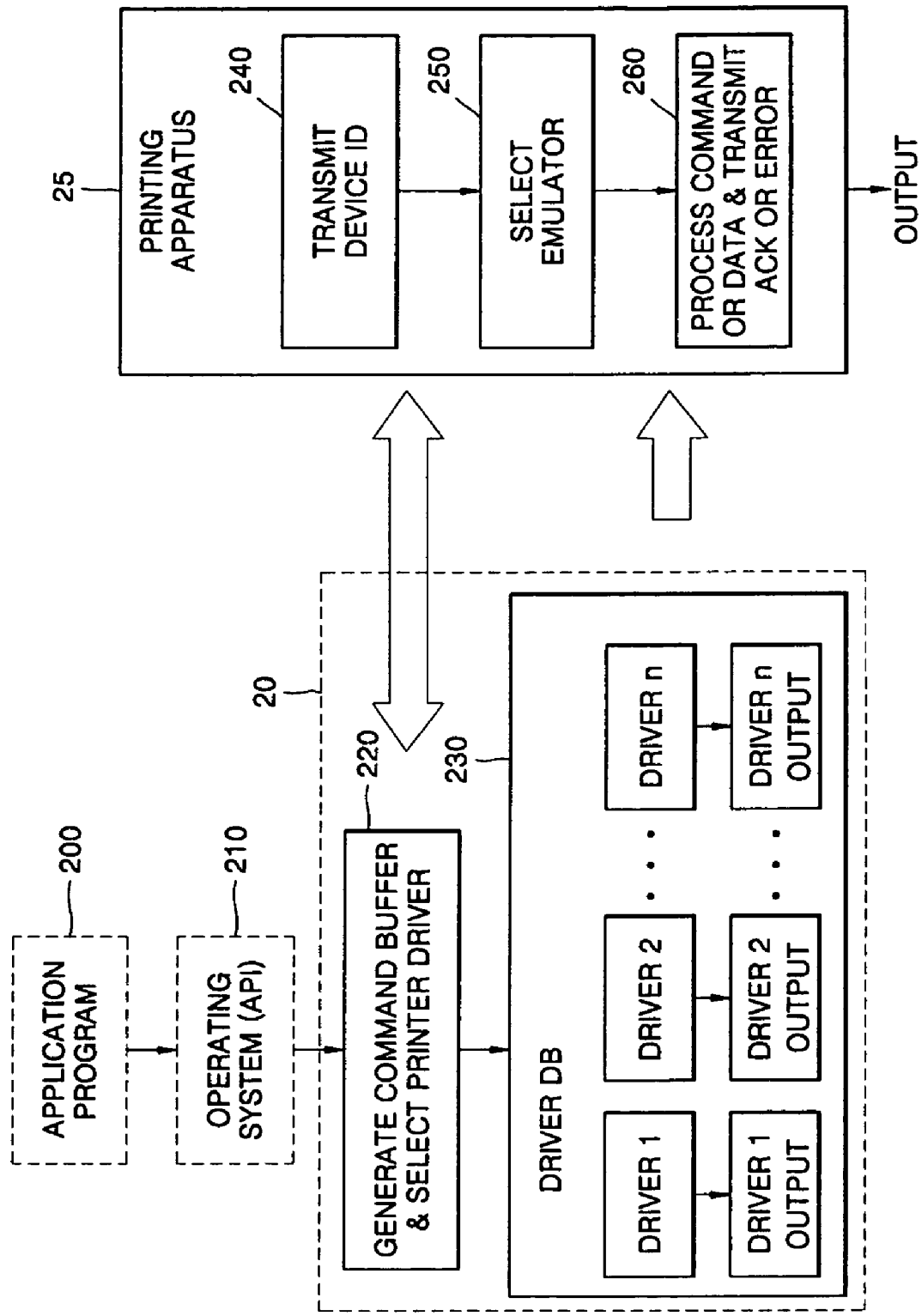
FIG. 2 is a view illustrating a printing system using a method and apparatus to change a printer driver according to an embodiment of the present general inventive concept.

FIG. 2 is a view illustrating a printing system using a method and apparatus to change a printer driver according to an embodiment of the present general inventive concept. The printing system includes a driver changing unit 20 and a printing apparatus 25. The driver changing unit 20 may be a personal or network computer, and the printing apparatus 25 may be an image forming apparatus, a facsimile machine, a printer, etc.

When a user desires to print an image or a text in an application program 200, the user generates a print command through a print menu. The print command is sent to the printer driver through an operating system 210, which corresponds to an interface of the application program 200. When the driver changing unit 20 generates a buffer and selects one of a plurality of printer drivers 1, 2, . . . , n from a driver database 230 in a unit 220 to output driver 1, 2 . . . , n outputs as the data for printing, the print command or print data is processed and printed by the printing apparatus 25.

When the print command is generated by the application program 200, the printing apparatus 25 transmits a printer device ID, which corresponds to an identification number of the printing apparatus 25, to the selected printer driver in a unit 240, selects an emulator corresponding to the selected printer driver in a unit 250, processes the print command or print data using the emulator in a unit 260, and transmits the processing result (acknowledgement (ACK) or error) to the selected printer driver.

Figure 3:
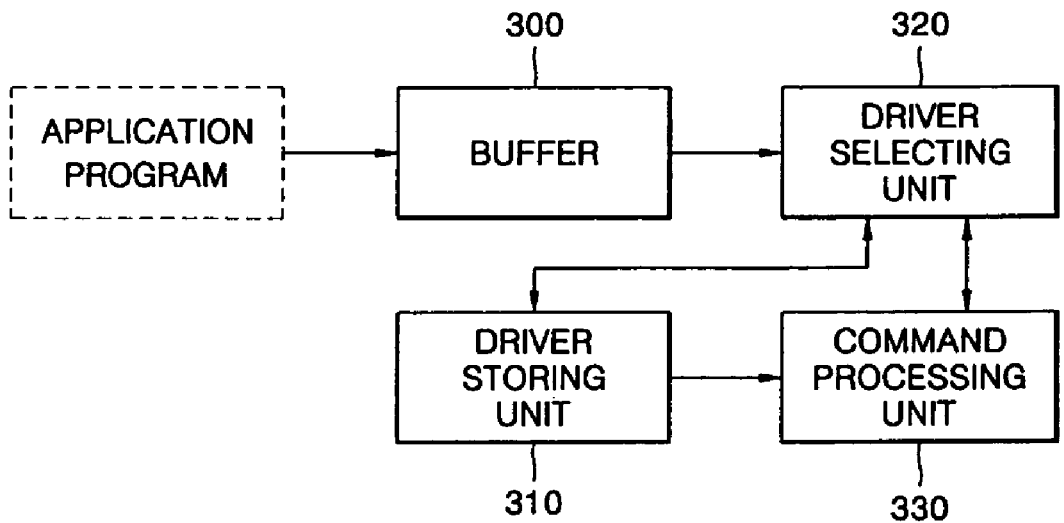
FIG. 3 is a block diagram illustrating an apparatus to change the printer driver according to an embodiment of the present general inventive concept.

FIG. 3 is a block diagram illustrating an apparatus to change a printer driver according to an embodiment of the present general inventive concept. The apparatus includes a buffer 300, a driver storing unit 310, a driver selecting unit 320, and a command processing unit 330.

The buffer 300 stores the print command. When being implemented as software in the apparatus to change the printer driver, the buffer 300 may be set by a buffer generator.

The driver storing unit 310 stores the plurality of printer drivers 1, 2, . . . , n corresponding to each printer model (a designated printer). For example, the driver storing unit 310 may store printer control language (PCL) drivers, graphics device interface (GDI) drivers, and postscript (PS) drivers by version.

When receiving printer identification information corresponding to the designated printer, the driver selecting unit 320 selects the one of the plurality of printer drivers corresponding to the printer identification information from the driver storing unit 310. The printer identification information may be a device ID of the designated printer.

The command processing unit 330 processes the print command stored in the buffer 300 using the one of the plurality of printer drivers selected by the driver selecting unit 320 and generates data which is needed, used, or required for printing. When an error occurs while processing the print command, the command processing unit 330 requests the driver selecting unit 320 to modify or change the selected printer driver. The command processing unit 330 may be included in the selected printer driver. The data for printing may be a reformatted print command when the command processing unit 330 is a PCL driver. The data for printing may also be bitmap print data when the command processing unit 330 is a GDI driver. Thus, the data for printing may be the bitmap print data or the reformatted print command, depending on a printer driver used or selected.

Figure 4:
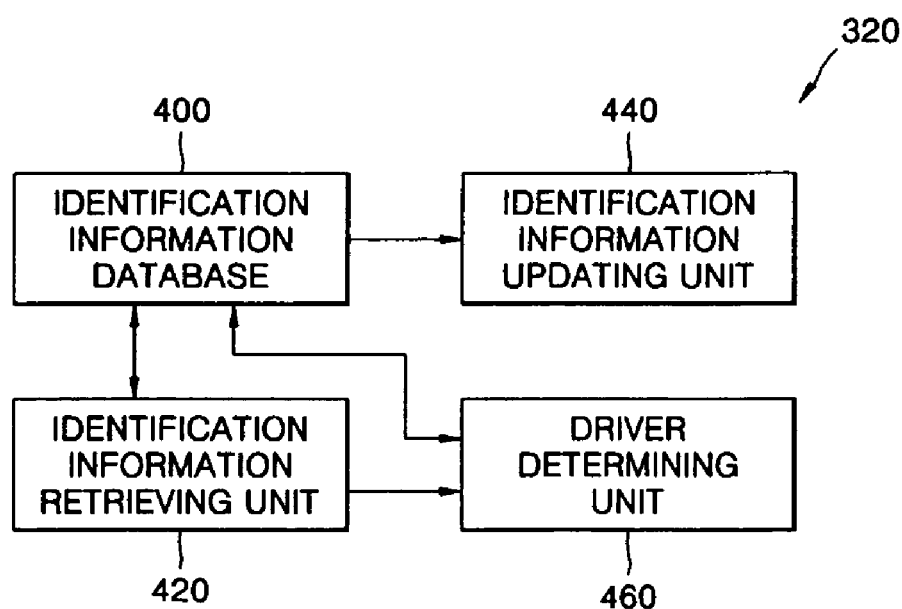
FIG. 4 is a detailed block diagram illustrating a driver selecting unit of the apparatus of FIG. 3.

FIG. 4 is a detailed block diagram illustrating the driver selecting unit 320. The driver selecting unit 320 includes an identification information database 400, an identification information updating unit 440, a driver identification information retrieving unit 420, and a driver determining unit 460.

The identification information database 400 stores printer identification information and at least one driver identification information corresponding to the printer identification information. For example, when a plurality of printer models are produced by different printer manufacturers, a plurality of printer drivers can be used for printing data in each of the printer models in a printing operation. For example, a plurality of first printer drivers can be used for printing the data in a first printer model (a first designated printer), and a plurality of second printer drivers can be used for printing the data in a second printer model (a second designated printer). The printer models can be distinguished from each other using the printer identification information, and IDs of the printer drivers that can be used for each printer model can be matched with identification information of each printer model and stored in a lookup table. If there are a plurality of printer drivers to correspond to each printer model, the IDs of the printer drivers may be stored in the lookup table in a priority order.

If an error occurs when the command processing unit 330 processes the print command or if the identification information updating unit 440 receives an error signal from the designated printer, the identification information updating unit 440 deletes the identification information of a corresponding printer driver or previously selected printer driver, and requests a change of the corresponding printer driver or the previously selected printer driver to another printer driver which can be used for printing the data in the designated printer. The another printer driver may be selected among the plurality of printer driver corresponding to the designated printer When receiving the printer identification information or the request for the change of the printer driver, the driver identification information retrieving unit 420 retrieves driver identification information corresponding to the received printer identification information from the identification information database 400. As described above, at the request for the change of printer driver, the identification information updating unit 440 deletes the identification information of the printer driver that is currently being used. Thus, the identification information of the printer driver is no longer used, and the identification information retrieving unit 420 retrieves second identification information of a new printer driver having a higher priority than other printer drivers that can be used for each printer model. Here, the new printer driver may be included in the plurality of printer drivers corresponding to the designated printer.

The driver determining unit 460 selects the new printer driver corresponding to the retrieved driver identification information from the driver storing unit 310.

An error that occurs when the command processing unit 330 processes a command may include a general protection fault (GPF). Also, an acknowledgement (ACK) signal indicating that a printer has completed the printing operation normally may not be generated within a predetermined period of time. An error may also occur when a printer processes a print command using a PCL driver. The GPF is a type of fatal exceptional errors that Windows cannot surely identify and is a general memory violation error. Before starting a software program, a memory is reserved and a job is performed using the memory. If the memory is not accurately reserved in the software program, important data stored in a hard drive may be lost. A GPF message prevents these problems that may potentially damage files or the data for printing.

Figure 5:
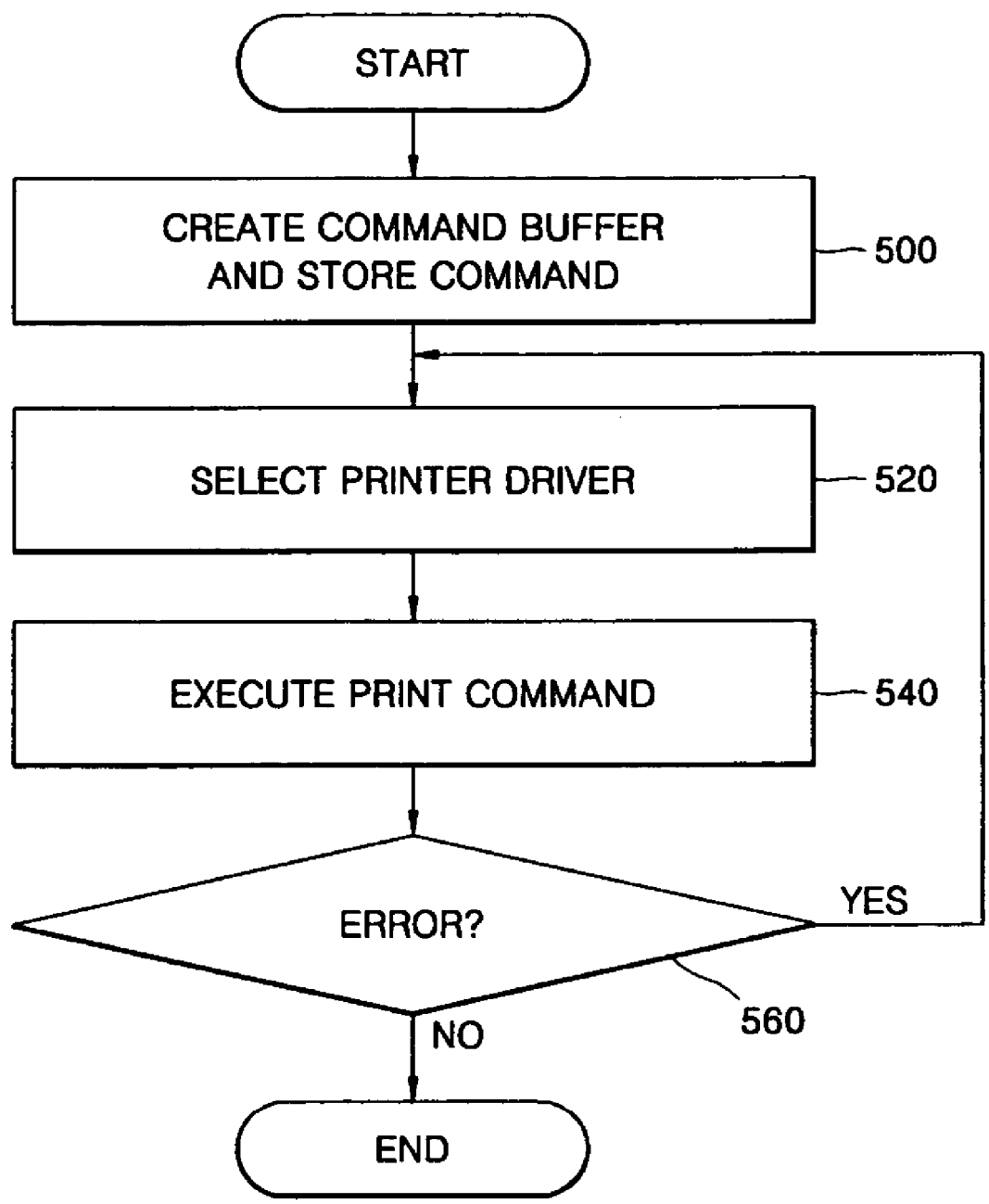
FIG. 5 is a flowchart illustrating a method of changing a printer driver according to an embodiment of the present general inventive concept.

FIG. 5 is a flowchart illustrating a method of changing a printer driver according to an embodiment of the present general inventive concept. Referring to FIGS. 2-5, when a print command is generated to print an image or a text in the application program 200, the print command is input to a printer driver via an application program interface (API) such as the operating system 210. When the print command is input to the printer driver, the print command is stored in the buffer 300 (operation 500). The printer driver to process the print command is selected (operation 520).

Figure 6:
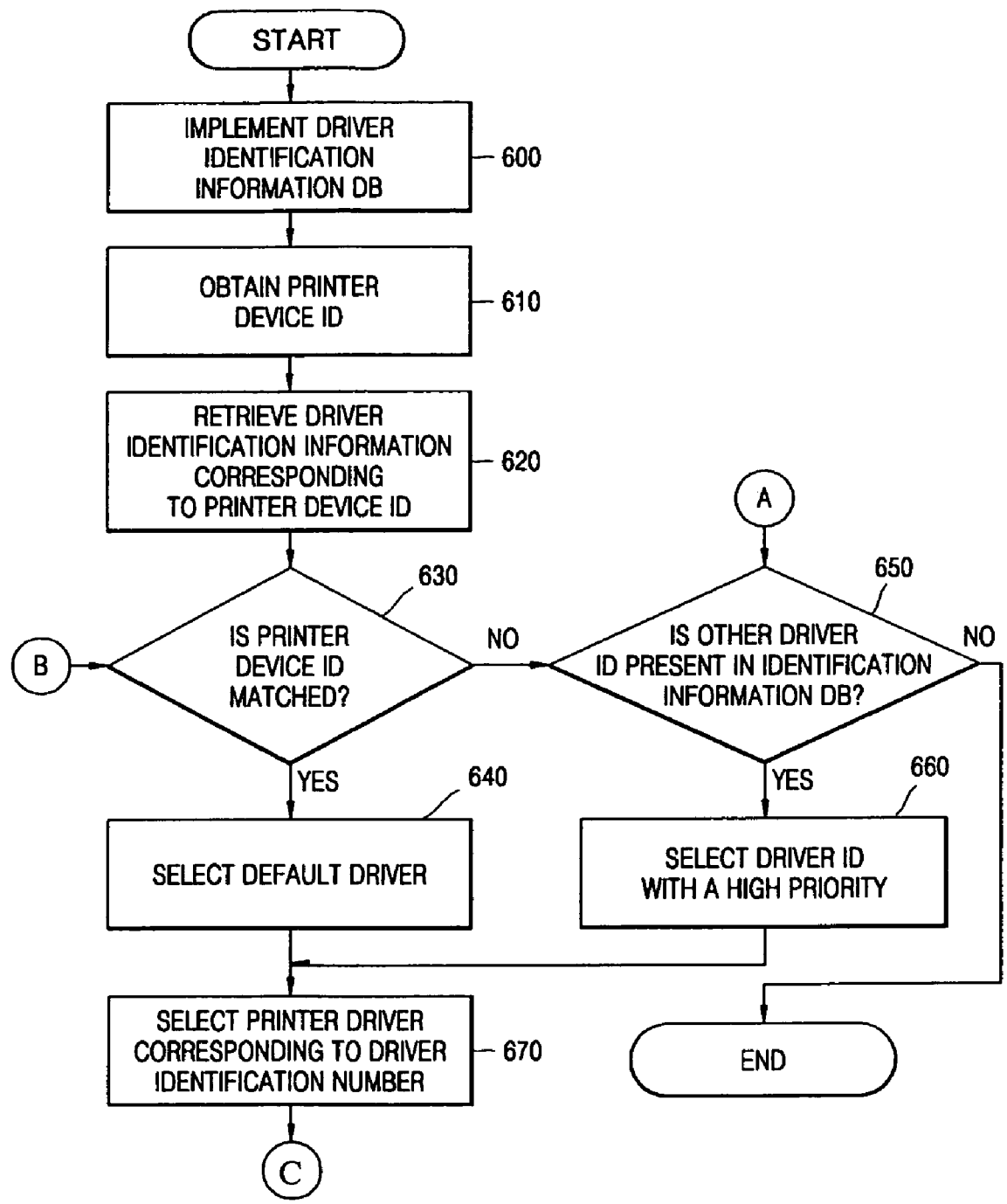
FIG. 6 is a flowchart illustrating a selecting operation of the printer driver in the method of FIG. 5.

FIG. 6 is a flowchart illustrating a selecting operation of the printer driver in the method of FIG. 5. Referring to FIGS. 2-6, the identification information database 400 may be implemented (operation 600). A printer device ID corresponding to printer identification information is transmitted from a printer, which corresponds to the printing apparatus 25 (operation 610). Driver identification information corresponding to the printer identification information is retrieved from the identification information database 400 using the identification information retrieving unit 420 (operation 620). In the identification information database 400, driver identification information is matched with each printer device ID. If a plurality of driver identification information is allocated to the printer device ID, the driver identification information includes a default driver ID, i.e., a default value, and identification information of other drivers to be selected in order of priority.

The identification information database 400 is inspected to determine whether the printer device ID is matched with the driver identification information (operation 630). When a plurality of driver identification information match the printer device ID, the default driver ID is selected (operation 640). If the default driver ID does not exist in the identification information database 400, the identification information database 400 is checked to determine whether other driver IDs are present (operation 650). If it is determined that the other driver IDs are present in the identification information database 400, a driver ID having a higher priority than other driver IDs is selected (operation 660). If a driver identification number of the driver ID is selected, a printer driver corresponding to the driver identification number is selected from the driver storing unit 310 (operation 670). In operation 650, if the other driver IDs are not present in the identification information database 400, no printer driver can be selected. Thus, the selecting of the printer driver is terminated, and a message informing that there is no printer driver available for printing the date in the designated printer may be sent to a user.

Referring back to FIG. 5, if the printer driver corresponding to the driver ID is selected, the selected printer driver processes the print command stored in the buffer 300 (operation 540), and it is checked whether an error occurs while the printer driver processes the print command (operation 560). If the error occurs, another printer driver is selected (operation 520) using the method of FIG. 6.

Figure 7:
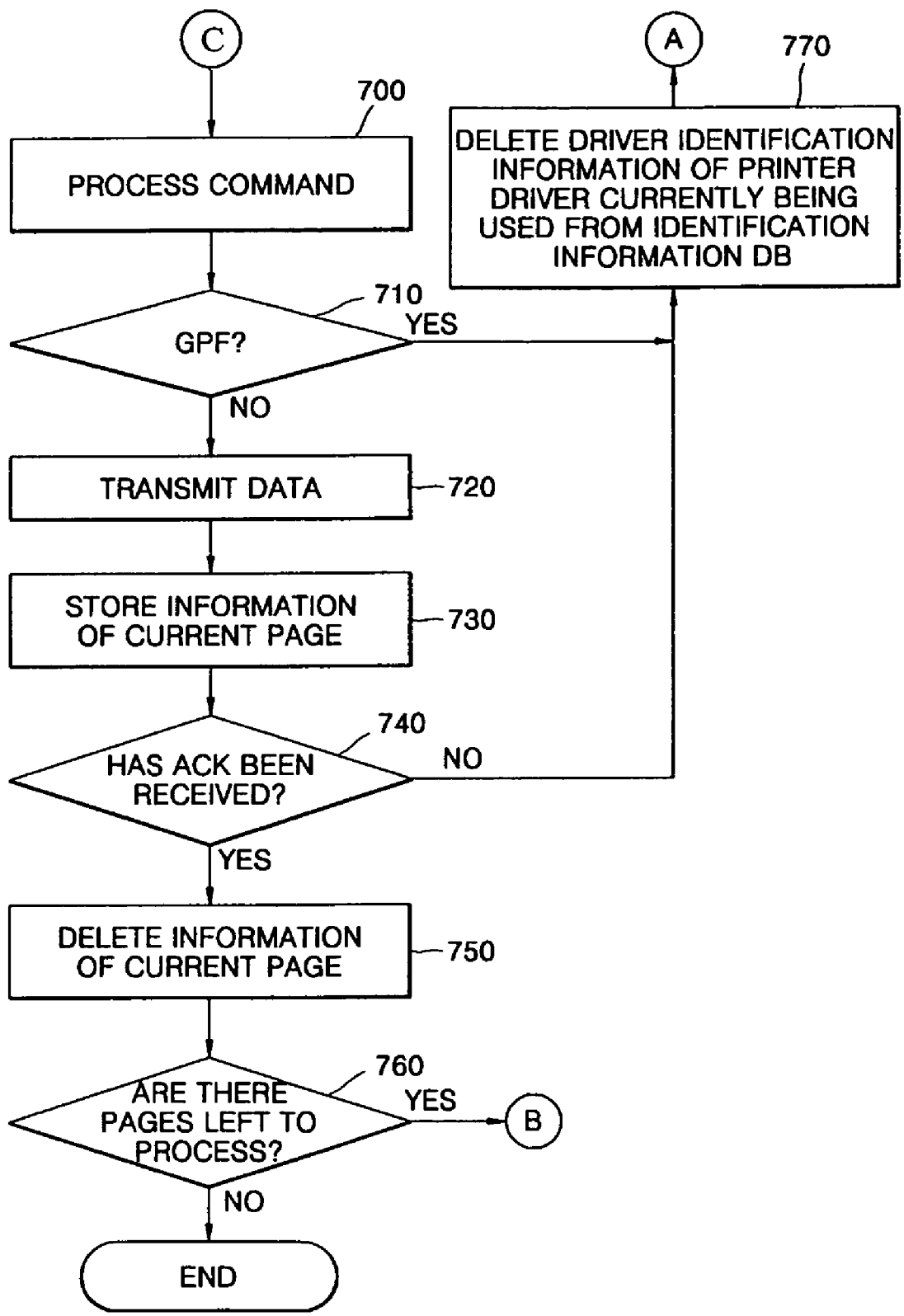
FIG. 7 is a flowchart illustrating a method of executing a print command stored in a buffer and processing an error in the method of FIGS. 5 and 6.

FIG. 7 is a flowchart illustrating an executing operation of a print command stored in the buffer 300 and processing an error in the method of FIG. 5. When the printer driver is selected, the print command stored in the buffer 300 is processed (operation 700). At this time, it is checked whether the GPF occurs (operation 710).

If the GPF occurs, the driver identification information of the printer driver currently being used is deleted from the identification information database 400 (operation 770). If the GPF does not occur, the print data is transmitted to the printer (operation 720) and information of a current page corresponding to the print data is stored (operation 730). It is checked whether an ACK signal indicating that the print data of the current page has been processed normally is received from the printer (operation 740). If the ACK signal is not received from the printer within a predetermined period of time, the current driver identification information is deleted from the identification information database 400 (operation 770). If the ACK signal is received normally, the information of the current page is deleted (operation 750) and it is checked whether there are other pages to process (operation 760). If there is no page to be processed, the executing of the print command is terminated. If there are pages to be processed, it is checked whether other driver IDs are present in the identification information database 400 in operation 650 of FIG. 6 to select another printer driver. The executing of the print command described above is performed in units of pages. However, it may also be performed in units of documents. That is, the executing of the print command may be performed in various units according to the embodiments of the present invention.

Figure 8:
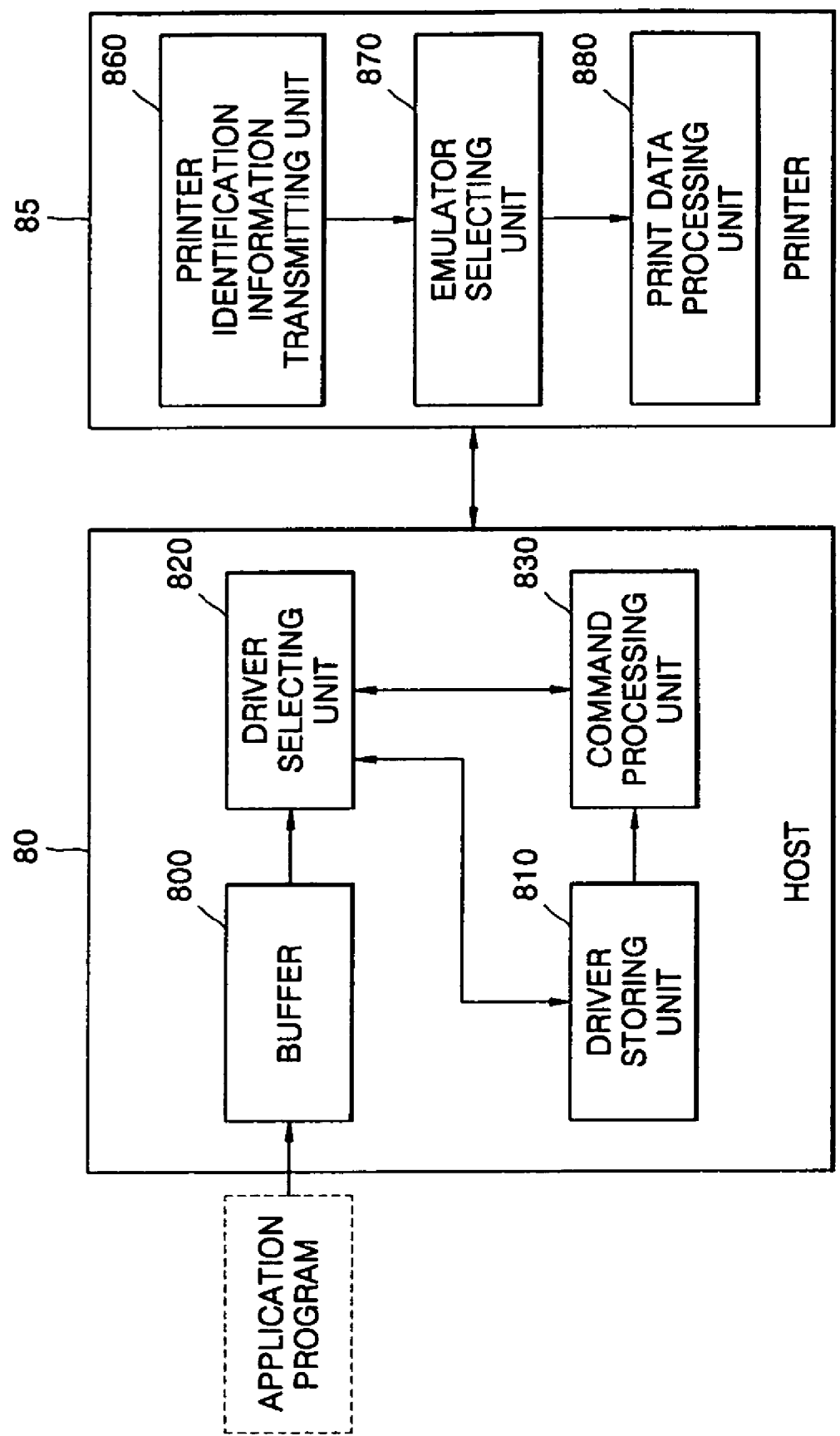
FIG. 8 is a block diagram illustrating a driver changeable printing system using an apparatus and method of changing a printer driver according to an embodiment of the present general inventive concept.

FIG. 8 is a block diagram illustrating a driver changeable printing system using an apparatus and method of changing a printer driver according to an embodiment of the present general inventive concept. The printing system includes a host 80 and a printer 85. When receiving printer identification information or a request for a change of a printer driver to another printer driver corresponding to the printer 85, the host 80 selects one of a plurality of printer drivers appropriate for the printer 85 as the printer driver or the another printer driver, and generates data for printing. The host 80 includes a buffer 820, a driver selecting unit 820, a driver storing unit 810, and a command processing unit 830. Since functions and operations of the buffer 800, the driver selecting unit 820, the driver storing unit 810, and the command processing unit 830 are similar to those of the buffer 300, the driver selecting unit 320, the driver storing unit 310, and the command processing unit 330 of FIGS. 2-4, their descriptions will be omitted.

The printer 85 selects one of a plurality of printer emulators corresponding to the selected printer driver selected by the host 80, and processes and prints the data for printing, which was generated by the host 80. The printer 85 includes a printer identification information transmitting unit 860, an emulator selecting unit 870, and a print data processing unit 880.

When a print job corresponding to a printing operation starts, the printer identification information transmitting unit 860 transmits printer identification information to the driver selecting unit 820. When receiving data created by the command processing unit 830, the emulator selecting unit 870 selects the printer emulator corresponding to the selected printer driver.

The print data processing unit 880 processes and prints the data created by the command processing unit 830 using the selected printer emulator and, when the data processing is completed normally or when an error occurs, informs the host 80 of its processing result. Since the operation of the host 80 is identical to that of the apparatus for changing a printer driver described above, descriptions thereof will be omitted.

Figure 9:
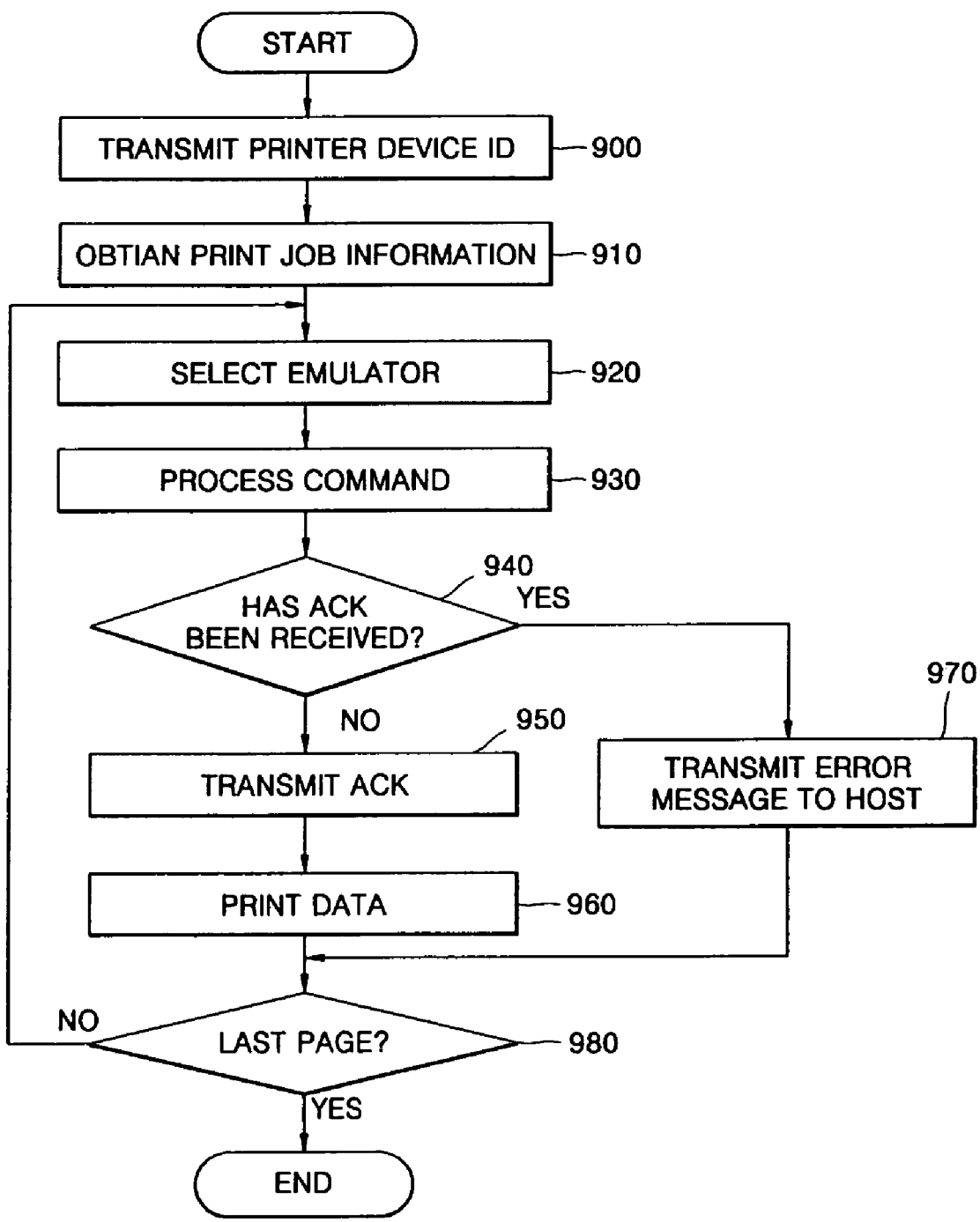
FIG. 9 is a flowchart illustrating a method of a printer of the driver changeable printing system in FIG. 8.

FIG. 9 is a flowchart illustrating a method of the printer 85 of FIG. 8. The operation of the printing system and a printing method will now be described with reference to FIG. 8. Since the operation of the host 80 of FIGS. 8 and 9 is similar to that of the apparatus to change a printer driver in FIGS. 2-7, the operation of the printer 85 will be described.

Referring to FIGS. 8 and 9, when the host 80 requests a printer device ID, the printer identification information transmitting unit 860 transmits a printer device ID (operation 900). The emulator selecting unit 870 obtains print job information (operation 910). The print job information refers to basic information for printing or date for printing, such as the number of pages of a document, the number of copies, resolution, and paper size. When the print job information is obtained, the emulator selecting unit 870 selects a printer emulator corresponding to the printer driver selected by the host 80 and appropriate for data to print (operation 920) and processes a reformatted print command using the print data processing unit 880 (operation 930).

The print data processing unit 880 checks whether an error occurs during processing the reformatted print command and, if an error occurs, transmits an error message to the host 80 (operation 970). When receiving the error message, the host 80 selects another printer driver in operation 650 of FIG. 6 described above.

If the print data processing unit 880 processes the reformatted print command without the error, the print data processing unit 880 transmits an ACK signal informing the processing result to the host 80 (operation 950). When the ACK signal is transmitted, the printer 85 prints data (operation 960) and terminates its printing operation when a last page is printed. If there are more pages to print in operation 980, a printer emulator is selected in operation 920.

According to the present embodiment, the printing system may have a host to store a plurality of first printer drivers that are used to print data in a first designated printer and a plurality of second printer drivers that are used to print the data in a second designated printer. The host may select one of the plurality of first printer drivers to communicate with the first designated printer to print, or select another one of the plurality of first printer drivers to communicate with the first designated printer according to a request to change the selected first printer driver to the another first printer driver. Also, the host may select one of the plurality of second printer drivers to communicate with the second designated printer to print, or select another one of the plurality of second printer drivers to communicate with the second designated printer according to a second request to change the selected second printer driver to the another second printer driver.

According to a method and apparatus to change a printer driver, a user can print data stably. In addition, when an error occurs, a printer driver currently being used is automatically changed to another appropriate printer driver. Thus, there is no need for a user to change the printer driver manually.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing method comprising:
    establishing in a storage unit a modifiable identification information database to store at least one printer identification information and a plurality of driver identification information corresponding to a plurality of printer drivers associated with the printer identification information;
    receiving with a driver selection unit the printer identification information from a printer;
    retrieving with the driver selection unit the driver identification information associated with the received printer identification information from the identification information database;
    selecting with a driver selecting unit one of the plurality of printer drivers corresponding to the driver identification information associated with the printer identification information upon receipt of the driver identification information or upon receipt of a request for a change of the printer driver corresponding to the received printer identification information, the printer driver corresponding to the retrieved driver identification information;
    generating with a command processing unit data for printing using the selected printer driver;
    determining with the command processing unit whether an error occurs in a printing operation;
    when it is determined by the command processing unit that the error has occurred, transmitting a request from the command processing unit to the driver selecting unit to change a selected driver; and
    in response to the request, deleting with the driver selecting unit the driver identification information from the identification information database, retrieving with the driver selection unit other driver identification information associated with the received printer identification information from the identification information database, and selecting with the driver selecting unit another printer driver corresponding to the other retrieved driver identification information, the other driver identification information having a higher priority than other driver identification information corresponding to the printer identification information from the identification information database.

2. The method of claim 1, wherein the selecting of the printer driver and the generating of the data using the selected printer driver comprises:
    storing a print command in a buffer when the print command is input;
    retrieving the driver identification information associated with the printer identification information from the identification information database when the printer identification information is input;
    selecting the printer driver corresponding to the retrieved driver identification information associated with the printer identification information from the identification information database when the printer identification information is input;
    generating the data for printing by processing the print command stored in the buffer using the printer driver corresponding to the driver identification information; and
    if the error occurs while processing the print command, generating a notification of the occurrence of the error.

3. The method of claim 2, wherein, if information regarding the error is received from the designated printer or if the error occurs during processing the print command, the selecting of the printer driver comprises:
    deleting the driver identification information from the identification information database;
    retrieving the other driver identification information corresponding to the printer identification information from the identification information database if the printer identification information is input subsequent to the deleting or if there is the request for the change of the printer driver; and
    selecting another printer driver corresponding to the retrieved driver identification information.

4. The method of claim 2, wherein the generating of the data comprises:
    executing the print command stored in the buffer using the selected printer driver;
    determining whether a general protection fault has occurred;
    deleting the driver identification information of the printer driver currently being used if it is determined that the general protection fault has occurred, and transmitting print data to the designated printer if it is determined that the general protection fault did not occur;
    storing information of a current page of the print data, and checking whether an ACK signal indicating that the print data has been processed normally is received from the designated printer; and
    deleting information of the current page corresponding to the ACK signal if the ACK signal is received, performing the executing, determining, outputting, and storing, operations until a last page of the print data is printed, and outputting the occurrence of the error to delete the identification information of the printer driver currently being used if the ACK signal is not received within a predetermined period of time.

5. The method of claim 1, further comprising:
    selecting a printer emulator corresponding to the selected printer driver from a plurality of printer emulators, and processing and printing the data for printing, and wherein the selecting of the printer emulator comprises:
transmitting the printer identification information when a print job corresponding to the data starts;
selecting from a plurality of printer emulators a printer emulator corresponding to the selected printer driver when receiving the data for printing;
processing the data for printing using the selected printer emulator;
transmitting an ACK signal if the processing of the data is normally completed and printing the data; and
transmitting an error signal if the processing of the data is not normally completed.

6. The method of claim 5, wherein the processing of the data and reporting of a processing result are performed in a unit of a page.

7. A printing system comprising:
a designated printer to print data; and
a host connected to the printer to store a plurality of printer drivers to correspond to the designated printer, to store driver identification information for each of the plurality of printer drivers associated with printer identification information of the designated printer in a modifiable database, to receive from the designated printer the printer identification information of the designated printer, to retrieve with a driver selection unit the driver identification information associated with the received printer identification information from the modifiable database, to select with a driver selecting unit the printer driver corresponding to the retrieved driver identification information, to generate with a command processing unit data that is used for printing in the designated printer using the printer driver according to the printer identification information of the designated printer or a request for a change of a previous printer driver that is used to communicate with the designated printer to print the data, to determine with the command processing unit whether an error has occurred during selection of one of the plurality of print drivers or generating the data used for printing, and, if the error has occurred, to delete with the driver selecting unit driver information of the presently-selected printer driver from a portion of the modifiable database corresponding to the printer identification information,
wherein when it is determined by the command processing unit that an error has occurred, the command processing unit transmits a request to the driver selecting unit to change a printer driver, and
in response to the request from the command processing unit, the driver selecting unit deletes the driver information of the presently-selected printer driver from the modifiable database, retrieves other driver identification information associated with the received printer identification information from the modifiable database, and selects another printer driver corresponding to the retrieved printer identification information, the other driver identification information having a higher priority than other driver identification information corresponding to the printer identification information from the identification information database.

8. The printing system of claim 7, wherein the host selects another one of the plurality of printer drivers associated with another driver identification information according to the request, and the selected another one of the plurality of printer drivers is used to print the data in the designated printer.

9. The printing system of claim 7, wherein the host stores second driver identification information for each of a plurality of second printer drivers associated with second printer identification information of a second designated printer in the modifiable database and selects one of the plurality of second printer drivers corresponding to the second driver information stored in the database, the second printer drivers being used for generating the data for the second designated printer upon receipt of the second printer identification information or a second request for a change of the selected second printer driver.

10. The printing system of claim 9, wherein the host comprises a driver storing unit to store the plurality of printer drivers that are used to generate the data to be printed in the designated printer, and the plurality of second printer drivers that are used to generate the data to be printed in the second designated printer.

11. The printing system of claim 9, wherein the host selects another one of the plurality of second printer drivers according to the second request, and the selected another one of the plurality of second printer drivers is used to print the data in the second designated printer.

12. A non-transitory computer-readable recording medium storing a program for executing a method of changing a printer driver, the method comprising:
storing a print command in a buffer when the print command is input;
storing a plurality of printer drivers in a driver storing unit to correspond to a designated printer;
creating a modifiable database and storing therein a plurality of driver identification information items and at least one printer identification information item in association one with the other;
retrieving with a driver selecting unit one of the driver identification information items associated with the printer identification information item corresponding to the designated printer to select from the driver storing unit the one of the plurality of printer drivers corresponding to the designated printer when the printer identification information is received;
generating with a command processing unit data for printing by processing the print command stored in the buffer using the selected printer driver;
determining with the command processing unit whether an error occurs in a printing operation;
when it is determined by the command processing unit that the error has occurred, transmitting a request from the command processing unit to the driver selecting unit to change a selected driver; and
in response to the request, deleting with the driver selecting unit the one of the plurality of printer drivers from a portion of the modifiable database corresponding to the printer information, selecting with the driver selecting unit a different one of the plurality of printer drivers corresponding to the printer information, and generating a notification of the occurrence of the error, the driver identification information of the different one of the plurality of printer drivers having a higher priority than the driver identification information of the other printer drivers.

13. A printing system comprising:
a storing unit to store a plurality of printer drivers corresponding to a printer, each of the printer drivers having printer driver identification information associated with printer identification information of the printer, the printer driver identification information of each of the printer drivers stored in the storing unit according to a selection priority such that a printer driver associated with a highest selection priority may be successively selected;

a selecting unit to select one of the printer drivers having the highest selection priority corresponding to the printer identification information received from the printer; and a processing unit to generate print data using the selected printer driver and to determine whether an error occurs in a printing operation, wherein when the processing unit determines that the error occurs, the processing unit transmits a request to the selecting unit to change a selected driver, and in response to the request from the processing unit, the selecting unit deletes printer driver identification of a selected printer driver and selects another printer driver having a next-highest priority.

14. The printing system of claim 13, wherein the selecting unit selects another of the printer drivers corresponding to the printer driver identification information having the highest selection priority of those remaining subsequent to the deletion.

15. The printing system of claim 14, further comprising:
a plurality of emulators respectively associated with the printer drivers to render the print data received from the selected one of the printer drivers.

16. The printing system of claim 15, further comprising an emulator selecting unit to select one of the emulators prior to the deletion of the printer driver identification information of the printer driver associated therewith and to select another one of the emulators corresponding to the other printer driver associated with the highest selection priority after the deletion of the printer driver identification information.

17. A printing method comprising:
storing a plurality of printer drivers corresponding to a printer corresponding to printer identification information such that the plurality of printer drivers is associated with the printer identification information of the printer and each of the printer drivers is associated with driver identification information stored according to a selection priority such that a printer driver associated with a highest selection priority may be successively selected;

selecting with a driver selecting unit one of the printer drivers having the highest selection priority corresponding to the printer identification information received from the printer;

generating with a command processing unit print data using the selected printer driver;

determining with the command processing unit whether an error has occurred in a printing operation;

when it is determined that an error has occurred, transmitting from the command processing unit to the driver selecting unit a request to change a selected driver; and in response to the request from the command processing unit, deleting with the driver selecting unit the printer driver identification information corresponding to one of the printer drivers the use of which resulted in the error and selecting with the driver selecting unit another one of the printer drivers having a highest selection priority from among the remaining printer drivers.

18. The printing method of claim 17, further comprising selecting one of a plurality of emulators prior to the deletion of the printer driver identification information of the printer driver associated therewith and to select another one of the emulators corresponding to the other printer driver associated with the highest selection priority after the deletion of the printer driver identification information.

19. A host comprising:
a modifiable identification information database to store at least one printer identification information and a plurality of driver identification information corresponding to a plurality of printer drivers associated with the printer identification information;

a driver selecting unit to receive from a printer the printer identification information of the printer, to retrieve the driver identification information associated with the received printer identification information from the database, and to select the printer driver corresponding to the retrieved driver identification information; and a command processing unit to generate data utilized to print using the selected printer driver, and to determine whether an error occurs in a printing operation;

wherein when the command processing unit determines that the error has occurred, the command processing unit transmits a request to the driver selecting unit to change a selected driver, and in response to the request from the command processing unit, the driver selecting unit deletes the driver identification information from the database, retrieves other driver identification information associated with the received printer identification information from the database, and selects another printer driver corresponding to the retrieved other driver identification information, the other driver identification information having a higher priority than other driver identification information corresponding to the printer identification information from the identification information database.

20. The host of claim 19, wherein the database stores a plurality of printer drivers, each printer driver among the plurality of the print drivers having a priority selectable among the plurality of print drivers.

* * * * *